United States Patent
Griesser et al.

(10) Patent No.: US 7,289,928 B2
(45) Date of Patent: Oct. 30, 2007

(54) METHOD FOR IMPROVING A SYSTEM FOR RECOGNIZING TIRE PRESSURE WHICH IS MEASURED IN AN INDIRECT MANNER

(75) Inventors: Martin Griesser, Eschborn (DE); Andreas Köbe, Bensheim (DE); Frank Edling, Chiba (JP); Michael Holtz, Burgwedel-Tönse (DE); Karl Perras, Mühlacker-Enzberg (DE)

(73) Assignee: Continental Teves A.G. & Co., OHG, Frankfurt (DE)

( * ) Notice: Subject to any disclaimer, the term of this patent is extended or adjusted under 35 U.S.C. 154(b) by 0 days.

(21) Appl. No.: 10/539,858

(22) PCT Filed: Dec. 5, 2003

(86) PCT No.: PCT/EP03/13766

§ 371 (c)(1),
(2), (4) Date: Jan. 23, 2006

(87) PCT Pub. No.: WO2004/058519

PCT Pub. Date: Jul. 15, 2004

(65) Prior Publication Data

US 2006/0155505 A1    Jul. 13, 2006

(30) Foreign Application Priority Data

Dec. 20, 2002   (DE) ................. 102 61 096

(51) Int. Cl.
    *G01L 7/00*   (2006.01)
(52) U.S. Cl. ........................................ 702/138; 73/146
(58) Field of Classification Search ................ 702/138; 73/146
    See application file for complete search history.

(56) References Cited

U.S. PATENT DOCUMENTS

| 5,670,716 A | 9/1997 | Tamasho et al. |
| 5,826,210 A | 10/1998 | Izumi et al. |
| 2003/0172728 A1* | 9/2003 | Gustafsson et al. ........... 73/146 |

FOREIGN PATENT DOCUMENTS

| DE | 19961681 | 10/2000 |
| DE | 10058140 | 1/2002 |
| EP | 0855597 | 7/1998 |

\* cited by examiner

*Primary Examiner*—Carol S. W. Tsai
*Assistant Examiner*—Xiuqin Sun

(57) ABSTRACT

The present device relates to a method of improving a indirect measurement tire pressure detection system. Such systems include a system that detects pressure loss based on wheel speed data. The present method determines reference values dependent upon driving parameters and produces a two-dimensional or multi-dimensional closed range of driving parameters. The closed range of driving parameters uses reference values that are determined to be currently valid.

7 Claims, 1 Drawing Sheet

METHOD FOR IMPROVING A SYSTEM FOR RECOGNIZING TIRE PRESSURE WHICH IS MEASURED IN AN INDIRECT MANNER

BACKGROUND OF THE INVENTION

The present invention relates to a method for improving a tire pressure detection system using indirect measurement.

Motor vehicles with electronic brake systems equipped with an ABS control (ABS: Anti-lock System), driving dynamics control, or systems of this type, frequently include programs for detecting a tire pressure loss which are able to detect such a tire pressure loss exclusively from the fact that rotational speed changes are encountered on the wheels as a consequence of the pressure loss. Further, it is known in the art to evaluate input signals of rotational speed sensors either alone or jointly with other sensors (yaw rate, lateral acceleration, etc.) in order to detect the driving situation.

The invention deals with the problem that spurious alarms in pressure loss detection systems (DDS) with indirect measurement, such as the method disclosed in DE 100 58 140 A1 in particular, become more frequent when the vehicle has a high point of gravity (e.g. due to a roof track) or when a trailer is coupled to the vehicle being equipped with the pressure loss detection system. These indirectly measuring pressure loss detection methods learn so-called reference values, which are basically used for a crosswise comparison of the individual wheels. In a four-wheel vehicle it has e.g. gained acceptance to consider three independent reference values. A first reference value describes the relation between two wheels on one axle, a second reference value describes the relation between two wheels on the same vehicle side, and a third reference value describes the relation between two diagonally opposite wheels.

Tire pressure control systems with indirect measurement per se known in the art such as the system described in DE 199 61 681 A1, admittedly, have been improved already by taking into account driving parameters such as the yaw rate, etc. However, so far individual driving parameters have always been considered separately. A combined consideration of driving parameters is not described in the state of the art.

In view of the above, an object of the invention involves providing a method which improves the prior art indirect tire pressure control systems to such effect that a combination of several driving parameters are taken into account for the detection of tire pressure loss.

SUMMARY OF THE INVENTION

According to the invention, this object is achieved by a method for improving a tire pressure system using indirect measurement. The method includes determining one or more reference values that are dependent upon driving parameters and producing a two-dimensional closed range of valid driving parameters.

The method of the invention as a whole allows for further minimizing the tendency to trigger spurious alarms of a pressure loss detection system such as DDS.

With the spread-out range of driving parameters, defined combinations of driving parameters are preferably declared as invalid. In a particularly preferred manner, only those reference values are used for the method to detect pressure loss, which are determined at a time when the driving parameters considered lie within the range of parameters. The reference values not employed can be disregarded or corrected depending on the driving parameters under review.

It is possible to use not only the quantities of wheel torque, vehicle speed, lateral acceleration and yaw rate as driving parameters but also other quantities such as characteristic quantities for straight travel or cornering parameters, respectively, in particular the learning of a cornering parameter in a learning phase which takes place only in selected driving situations in an especially preferred manner, tire torsion and slip.

The driving parameter 'wheel torque' in this respect shall be considered as the wheel torque of a driven wheel or a quantity of corresponding behavior, with the wheel torque being in particular determined by way of a rating that results among others from engine data and power transmission data. The yaw rate and lateral acceleration in the disclosed method are either measured by sensors in a per se known manner or produced from wheel speed data.

It is preferred to use the driving parameters for the activation and/or deactivation of the data input in the pressure loss detection method or for the correction of the characteristic quantities found.

In the most simple, preferred case, the zone covered by the driving parameters is limited depending on the range of parameters by straight lines or two-dimensional or multi-dimensional surfaces, respectively, what is, however, not imperative.

Preferably, at least three driving parameters are reviewed in combination.

The term 'stationary travel' implies that the motor vehicle is undisturbed to move straight on, under conditions as ideal as possible. The 'imaginary curve' can e.g. be determined by recording the wheel torque M at the driven wheels during stationary travel for all possible driving speeds v. A function M(v) is hereby achieved.

Advantageously, the method of the invention permits evaluating the influence of wheel load and wheel torque on the wheel slip. The accuracy of the pressure loss detection system (DDS) with an indirect measurement profits from the result of this evaluation.

Preferably, the method for pressure loss detection comprises a learning phase and a comparing phase. In the comparing phase subsequent to the learning phase the currently determined reference values are compared with thresholds that can be produced by means of learnt reference values.

The reference values are preferably produced from wheel speed data by calculation of a quotient of sums. The reference values are averaged and/or filtered in particular. Some or all of the driving parameters are also averaged and/or filtered in an especially preferred manner.

It is preferred to learn the reference values individually for several speed intervals. It is also preferred to carry out the comparison in the comparing phase individually in different speed intervals.

Preferably, a curve parameter is additionally produced and learned in the driving situation 'straight travel', and it is possible in a particularly preferred manner to employ a second straight travel detection method in order to detect this driving condition.

In some vehicles (e.g. vehicles without ESP), the wheel speed data for determining the driving parameters cannot be obtained directly from data defined by sensors (yaw rate sensor and similar sensors). The driving parameters can be produced from the wheel speed data in these vehicles (so-called 'ABS-Only' vehicles). Preferably, it is not the wheel speed data calculated in the function module for the anti-lock system (ABS) that is used but the raw data being used by the wheel speed sensors in an uncorrected fashion. A particularly high rate of accuracy of the tire pressure detection system can be achieved this way.

A detection of straight travel, which is comparatively less accurate, can be carried out by means of a separate method (second straight travel detection method). Preferably, already learnt values of the first straight travel detection method are rejected when cornering is detected by the second straight travel detection method. This second method in particular recognizes also when the assumption 'straight travel' for learning the inverting curve radii was wrong. The learning operation is rejected then. Criteria for activating/deactivating the indirectly measuring pressure loss detection method (DDS) can be derived from an estimated yaw rate and lateral acceleration.

BRIEF DESCRIPTION OF THE DRAWINGS

Further features and advantages of the method of the invention can be taken from the following description of the figures. In the figures.

DETAILED DESCRIPTION OF THE DRAWINGS

Figure 1:
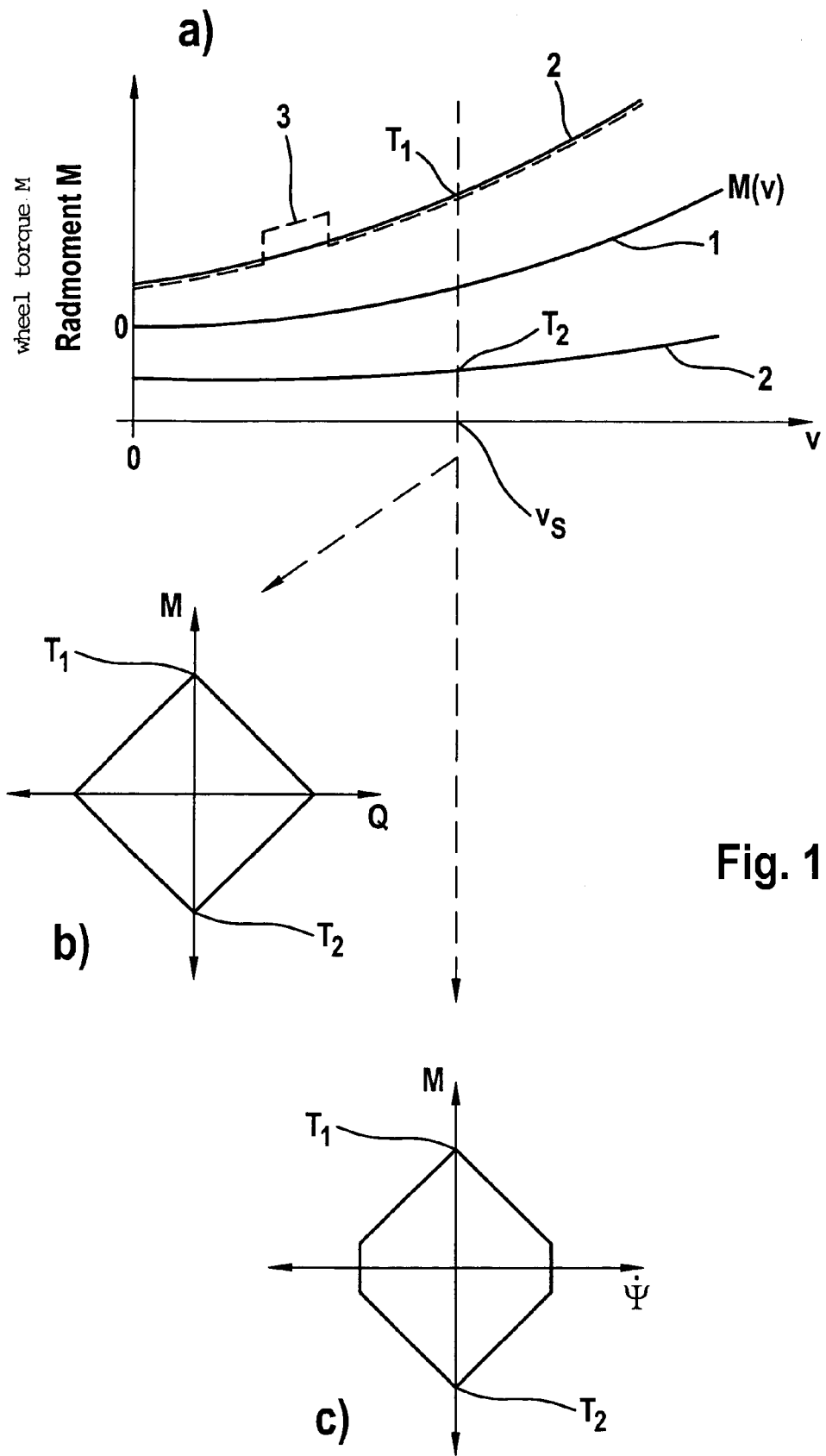
FIG. 1a illustrates the wheel torque v. vehicle speed.
FIG. 1b illustrates a plot of the wheel torque v. lateral acceleration.
FIG. 1c illustrates a plot of the wheel torque v. the yaw rate.

With reference to FIG. 1a, the wheel torque M is plotted against the vehicle speed v. Curve 1 in this respect describes a function M(v) of the wheel torque plotted against the speed of a vehicle. A band 2 is placed around this curve 1 forming a closed range of driving parameters in the plane spread out by the wheel torque and the vehicle speed. Curve 1 is plotted during stationary travel. A discontinuity 3 results in the course of the band 2 in the operation of the vehicle with a trailer. For the sake of clarity, the course of the band 2 with the discontinuity 3 decisive for the trailer operation is shown in dotted lines and offset with respect to band 2. At a defined value VS of the vehicle speed, the ranges of driving parameters (illustrated by the values T1 and T2) of the wheel torque M are plotted against another driving parameter such as the lateral acceleration Q (illustrated in FIG. 1b) or the yaw rate $\dot{\psi}$ (illustrated in FIG. 1c), whereby completely closed ranges of driving parameters are achieved. Only the reference values lying within these ranges of driving parameters are admitted as valid reference values.

The invention claimed is:

1. A method of improving a tire pressure detection system with indirect measurement, the tire pressure detection system detects tire pressure using wheel speed data, the method comprising:

determining one or more reference values, wherein the one or more reference values are dependent upon driving parameters;

producing a two-dimensional or multi-dimensional completely closed range of driving parameters, wherein the determined one or more reference values are admitted as being valid;

placing a band around an imaginary curve of the function of a first driving parameter depending on a second driving parameter; and forming the closed range of driving parameters in a plane using the band, wherein the plane is spread out by the first driving parameter and the second driving parameter and the curve is plotted during stationary travel, wherein data input to the pressure detection system is activated or deactivated based on the driving parameters.

2. The method of claim 1, wherein the driving parameters include a selection of two or more driving parameters from a group including: lateral acceleration; characteristic quantity for strait travel; vehicle yaw rate; vehicle lateral acceleration; wheel torque; tire torsion; slip; and vehicle speed.

3. The method of claim 2, wherein the driving parameter wheel torque is the wheel torque of a driven wheel or a quantity of corresponding behavior, with the wheel torque being determined using a rating which results from engine data and power transmission data.

4. The method of claim 2, wherein the lateral acceleration and the yaw rate are either measured by sensors or produced from wheel rotational data.

5. The method of claim 2, wherein the first driving parameter is the wheel torque and the second driving parameter is the vehicle speed.

6. The method of claim 5, wherein the first zone of driving parameters spreads out a plane at a defined value of the second driving parameter jointly with a third driving parameter, such as the lateral acceleration or the yaw rate, wherein a surface of the plane depends on the second driving parameter and the third driving parameter.

7. The method of claim 5, wherein the band includes a discontinuity) which expands or narrows the range of driving parameters within the range defined by the band within a range of the second driving parameter.

* * * * *